(12) United States Patent
Matsumoto

(10) Patent No.: US 8,557,427 B2
(45) Date of Patent: Oct. 15, 2013

(54) ELECTRIC POWER TOOL

(75) Inventor: Hiroshi Matsumoto, Hikone (JP)

(73) Assignee: Panasonic Corporation, Osaka (JP)

( * ) Notice: Subject to any disclaimer, the term of this patent is extended or adjusted under 35 U.S.C. 154(b) by 1247 days.

(21) Appl. No.: 11/984,648

(22) Filed: Nov. 20, 2007

(65) Prior Publication Data

US 2008/0124615 A1 May 29, 2008

(30) Foreign Application Priority Data

Nov. 27, 2006 (JP) .................................. 2006-319062

(51) Int. Cl.
*H01M 6/42* (2006.01)

(52) U.S. Cl.
USPC .......................................... 429/149; 429/151

(58) Field of Classification Search
USPC ........................................................... 429/96
See application file for complete search history.

(56) References Cited

U.S. PATENT DOCUMENTS

| | | | |
|---|---|---|---|
| 6,933,689 B2 | 8/2005 | Yamamoto | |
| 7,455,544 B2 * | 11/2008 | Glauning et al. | 439/352 |
| 2001/0017532 A1 * | 8/2001 | Han | 320/114 |
| 2004/0051502 A1 * | 3/2004 | White et al. | 320/107 |
| 2006/0055369 A1 | 3/2006 | Duesselberg | |
| 2006/0091852 A1 * | 5/2006 | Watson et al. | 320/114 |
| 2006/0151189 A1 | 7/2006 | Wu | |
| 2006/0199072 A1 * | 9/2006 | Lui et al. | 429/97 |

FOREIGN PATENT DOCUMENTS

| | | | |
|---|---|---|---|
| JP | 10-015851 | * | 1/1998 |
| JP | 2003-317687 | | 11/2003 |
| JP | 2006-263830 | | 10/2006 |
| WO | WO2006040204 | * | 4/2006 |

* cited by examiner

*Primary Examiner* — Ula C Ruddock
*Assistant Examiner* — Jacob Marks
(74) *Attorney, Agent, or Firm* — Bacon & Thomas, PLLC

(57) ABSTRACT

An electric power tool includes a main body having a drive portion with a motor, an output portion for holding a tool, and a battery pack attachment portion, and a battery pack attached to the battery pack attachment portion by means of an attaching and detaching mechanism. The battery pack supplies electric power to the drive portion to operate the output portion. The attaching and detaching mechanism has a releasing unit for releasing the battery pack from the main body by operating plural types of release operation portions in their entirety.

14 Claims, 11 Drawing Sheets

ELECTRIC POWER TOOL

FIELD OF THE INVENTION

The present invention relates to an electric power tool.

BACKGROUND OF THE INVENTION

Conventionally, as shown in FIG. 11, an electric power tool A includes a main body 201 and a rechargeable battery pack 202 detachably attached to the main body 201. As a mechanism for attaching and detaching the battery pack 201 to and from the main body 201, there has been employed, e.g., a structure, in which a pair of locking pieces 233 provided in symmetrical positions on the left and right sides of the battery pack 202 are independently engaged with a pair of engaging recesses 236 of the main body 201. More specifically, each of the locking pieces 233 is provided, at one end, with a hook portion 234 which is biased by a spring 235 into engagement with the corresponding engaging recess 236 and, at the other end, with a release operation portion 206 which may be pressed inwardly against the biasing force of the spring 235 to thereby release the hook portion 234 from the corresponding engaging recess 236 (see, e.g., Japanese Patent Laid-open Application No. 2006-263830).

The attaching and detaching mechanism is designed to ensure that, even when the electric power tool A is bumped against other objects and eventually the one release operation portion 206 of one of the locking pieces 233 is erroneously pressed, the other hook portion 234 of the other locking piece 233 remains engaged with the corresponding engaging recess 236. Thus the battery pack 2 is prevented from being dropped from the main body 201. However, in case the battery pack 202 is hastily grasped and the release operation portions 206 of the pair of locking pieces 233 are simultaneously pressed erroneously, the battery pack 202 may be dropped from the main body 201.

As noted above, in view of the ease of detachment, the attaching and detaching mechanism ensures that the battery pack 202 can be detached from the main body 201 by using the pair of the graspingly operable release operation portions 206 of the same kind arranged in the left and right symmetrical positions. For this reason, there still exists a high risk that the battery pack 202 is dropped from the main body 201 by the erroneous grasping operation to press the release operation portions 206 at the time when the electric power tool A is hastily grasped. That is to say, the attaching and detaching mechanism has no capability of reliably preventing the battery pack 202 from being inadvertently separated from the main body 201.

SUMMARY OF THE INVENTION

The present invention provides an electric power tool capable of reliably preventing a battery pack from being inadvertently separated from a main body.

In accordance with an embodiment of the present invention, there is provided an electric power tool including: a main body having a drive portion with a motor, an output portion for holding a tool, and a battery pack attachment portion; and a battery pack attached to the battery pack attachment portion by means of an attaching and detaching mechanism, the battery pack supplying electric power to the drive portion to operate the output portion, wherein the attaching and detaching mechanism has a releasing unit for releasing the battery pack from the main body by operating plural types of release operation portions in their entirety. With such configurations, since the attaching and detaching mechanism for attaching the battery pack to the battery pack attachment portion of the main body includes the releasing unit for releasing the battery pack from the main body by operating plural typess of release operation portions in their entirety, it is possible to prevent any separation of the battery pack from the main body when one of the release operation portions is erroneously operated by, e.g., striking the electric power tool against an object, or when one of the release operation portions is erroneously operated by hastily grasping the electric power tool. This makes it possible to reliably prevent the battery pack from being inadvertently detached from the main body.

Further, the release operation portions are respectively arranged in the battery pack and the main body. With such configurations, the plural types of release operation portions can be arranged in relatively distant positions. This reduces the possibility that the releasing unit is erroneously operated by the erroneous operation of all of the release operation portions and helps improve the effect of preventing any inadvertent separation of the battery pack from the main body.

Further, the attaching and detaching mechanism includes a plurality of retainer units for retaining the battery pack in the main body, the retainer units adapted to be released in response to the operation of the release operation portions, and wherein the retainer units include a release state keeping unit for keeping the battery pack released from the battery pack attachment portion when the battery pack is released by operating the release operation portions. With such configurations, since the retainer units include a release state keeping unit, the battery pack can be detached from the battery pack attachment portion by operating the plural kinds of the release operation portions one after another. This makes it possible to easily perform the task of detaching the battery pack from the battery pack attachment portion.

Further, the attaching and detaching mechanism includes a retaining guide unit for normally retaining the battery pack in the main body through an approaching operation of the battery pack toward the battery pack attachment portion. With such configurations, the retaining guide unit ensures that the task of normally retaining the battery pack in the main body is finalized by the approaching operation of the battery pack to the battery pack attachment portion. This helps improve the ease with which the battery pack is attached to the battery pack attachment portion.

Furthermore, the electric power tool further includes an elastic body for biasing the battery pack attached to the battery pack attachment portion in a direction of separating the battery pack from the battery pack attachment portion. With such configurations, the elastic body assists in detaching the battery pack from the battery pack attachment portion. This helps improve the ease with which the battery pack is detached from the battery pack attachment portion.

Further, the battery pack attachment portion is downwardly opened and wherein the attaching and detaching mechanism includes a first retainer unit for retaining a top portion of the battery pack in the main body in a suspended state and a second retainer unit for retaining a bottom portion of the battery pack in the main body. With such configurations, it is possible to reliably prevent the battery pack from falling down from the main body, because the battery pack is retained in the main body through the suspension support offered by the first retainer unit and the bottom support provided by the second retainer unit.

Furthermore, the attaching and detaching mechanism includes a second release operation portion for releasing the second retainer unit, the second release operation portion being arranged inwardly of an outer surface of the main body.

The operation button and the retainer unit that correspond to each other tend to be arranged in mutually neighboring positions for simplicity of configuration and, according to this tendency, the second release operation portion is arranged on the outer surface, particularly the bottom surface of the main body near the second retainer unit supporting the bottom of the battery pack. If the second release operation portion corresponding to the second retainer unit is arranged inwardly of the outer surface of the main body as noted above, it is possible to avoid any erroneous operation of the second release operation portion even when the bottom surface of the main body is laid on a rest surface.

It is preferable that the electric power tool further includes a detection part for detecting failure to normally retain the battery pack in the main body and a control unit for controlling output power of the output portion in response to the detection of the detection part. With such configurations, when the detection part detects that the battery pack is not normally retained in the main body, the control unit can perform the control of removing or reducing the output power of the output portion so that the user of the electric power tool can readily appreciate the situation. This allows the user to perceive that the battery pack is not normally retained in the main body and urges the user to take a measure for normally retaining the battery pack in the main body so that the battery pack can be firmly attached to and retained in the main body.

The present invention provides an advantage in that the battery pack can be reliably prevented from being inadvertently separated from the main body.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Figure 1:
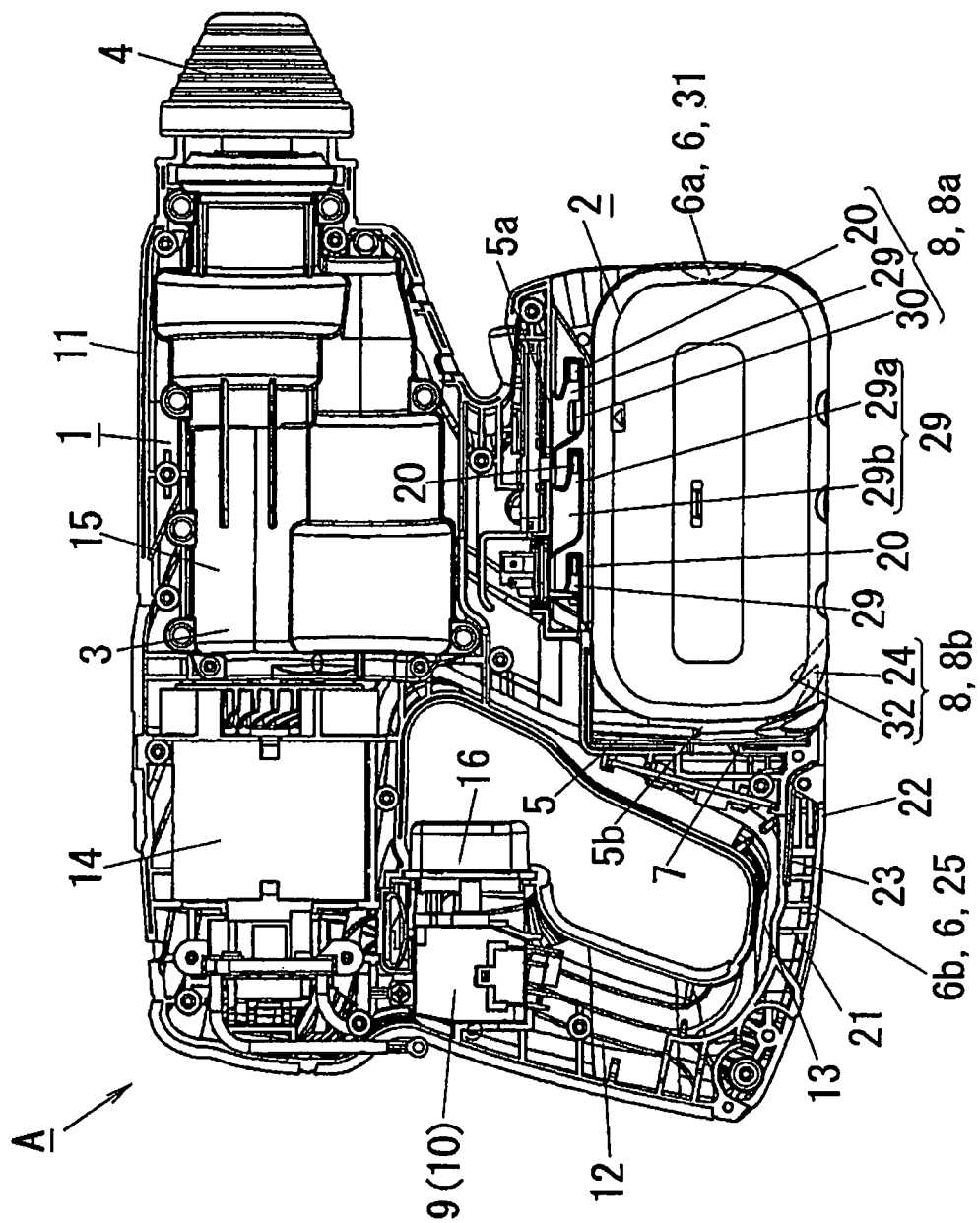
FIG. 1 is a side elevational section view showing an electric power tool in accordance with one embodiment of the present invention, in which a battery pack is normally retained in a main body.

Hereinafter, example embodiments of the present invention will be described with reference to the accompanying drawings.

As shown in FIGS. 1 to 10, an electric power tool A, e.g., an impact driver, of the present embodiment includes a main body 1 and a battery pack 2 detachably attached to the main body 1 through an attaching and detaching mechanism.

The main body 1 is provided with a housing that includes a horizontally extending cylindrical main body portion 11, a grip portion 12 downwardly extending from the rear end side of the main body portion 11, a battery pack attachment portion 5 provided in the front lower section of the main body portion 11 and a generally horizontally extending connection portion 13 for interconnecting the lower ends of the battery pack attachment portion 5 and the grip portion 12. For the purpose of convenience, the direction in which a tool fastened to the main body portion 11 protrudes will be referred to as a "front direction" (indicated by an arrow "a"), with the opposite direction thereof as a "rear direction" (indicated by an arrow "b"). The direction in which the grip portion 12 projects from the main body portion 11 will be referred to as an "downward direction" (indicated by an arrow "d"), with the opposite direction thereof as a "upward direction" (indicated by an arrow "c"). The direction orthogonal to both the upward-downward direction and the front-rear direction will be referred to as a "left-right direction" or "lateral direction" (indicated by an arrow "e").

The main body portion 11 includes an output portion 4, to the front side of which a tool is removably attached, and a drive portion 3 for driving the output portion 4. In the drive portion 3, there are provided a motor 14 driven by an electric power supplied from the battery pack 2 and a power transmission mechanism 15, e.g., a speed reduction mechanism, for converting the drive power of the motor 14 to an output torque suitable for the output portion 4 and then transmitting the output torque to the output portion 4. The grip portion 12 is provided with a trigger-type switch handle 16 that performs drive control of the motor 14 through a control unit 9. The battery pack attachment portion 5 is a portion to which the battery pack 2 is detachably attached and having a space opened in the front, lateral and downward directions. In other words, the battery pack attachment portion 5 includes a ceiling attachment section 5a and a rear attachment section 5b. Formed in the ceiling attachment section 5a is an attachment groove 17 for receiving a mounting base portion 27 of the battery pack 2 to be described later. A body-side power supply terminal 18a and a body-side control terminal 19a protrude downwardly from an inner ceiling surface of the attachment groove 17. The body-side power supply terminal 18a and the body-side control terminal 19a are connected to the control unit 9 via lead lines arranged within the housing. Locking lug portions 20 of a flat plate shape protrude from the inner side surfaces of the attachment groove 17. In the illustrated embodiment, three pairs of locking lug portions 20 are provided at specific intervals along the front-rear direction. In the rear attachment section 5b, there is provided an elastic body 7 formed of a leaf spring in such a manner that the elastic body 7 protrudes forwardly when the battery pack 2 is not attached to the battery pack attachment portion 5. A downwardly opened lower groove 21 is formed in the bottom surface of the connection portion 13. A locking piece 22 is secured to the connection portion 13 through a spring 23 while covering the opened area of the lower groove 21. More specifically, the locking piece 22 is pivotally attached at its center in a front-rear direction in such a state that the front end portion of the locking piece 22 having an upwardly extending hook portion 24 protrudes toward the battery pack attachment portion 5 by the biasing force of the spring 23 and further that the locking piece 22 is generally parallel to the bottom surface of the connection portion 13 in a position just above the latter. The locking piece 22 is designed to ensure that the front end portion having the hook portion 24 can be downwardly pivoted by upwardly pushing an operation button 25 formed in the rear portion thereof against the biasing force of the spring 23 within the lower groove 21.

The battery pack 2 includes of a battery receiving portion 26 and a mounting base portion 27 protruding from the top surface of the battery receiving portion 26. A plurality of rechargable batteries 28 is received within the battery receiving portion 26 in a laying-down state and is arranged in front and rear directions and also in two stages one atop above. In the present embodiment, lithium ion batteries are used as the rechargable batteries 28. The mounting base portion 27 is provided with a battery-side power supply terminal 18b and a battery-side control terminal 19b. Furthermore, the mounting base portion 27 is provided on its left and right sides with locking groove portions 29 of an inverted L-shape having an upwardly opened vertical groove section 29b and a horizontal groove section 29a extended forwardly from the lower end of the vertical groove section 29b. An engaging protrusion 30 for opening and closing one of the locking groove portions 29 is retractably arranged in a bottom portion of the vertical groove section 29b and the horizontal groove section 29a of one of the locking groove portions 29 (the front locking groove portion 29 in the present embodiment). The engaging protrusion 30 is normally projected upwardly by the biasing force of a spring (not shown) to close up the locking groove portion 29. As an operation button 31 provided on the front surface of the battery pack 2 is pushed down by a user, the engaging protrusion 30 is retracted from the top surface of the battery receiving portion 26 into the latter to bring the locking groove portion 29 into an opened state. A locking recess portion 32 is formed in the rear region of the bottom surface of the battery pack 2. More particularly, the locking recess portion 32 is inclined upwardly backwardly from the bottom surface of the battery pack 2. The hook portion 24 protrudes backwards and upwards from the locking piece 22 so that it can be smoothly inserted into the locking recess portion 32 of the battery pack 2 as the latter is slidingly moved in the backward direction. Once the hook portion 24 comes into engagement with the locking recess portion 32, it can firmly hold the battery pack 2 in place against any movement in the front and downward directions.

Figure 9:
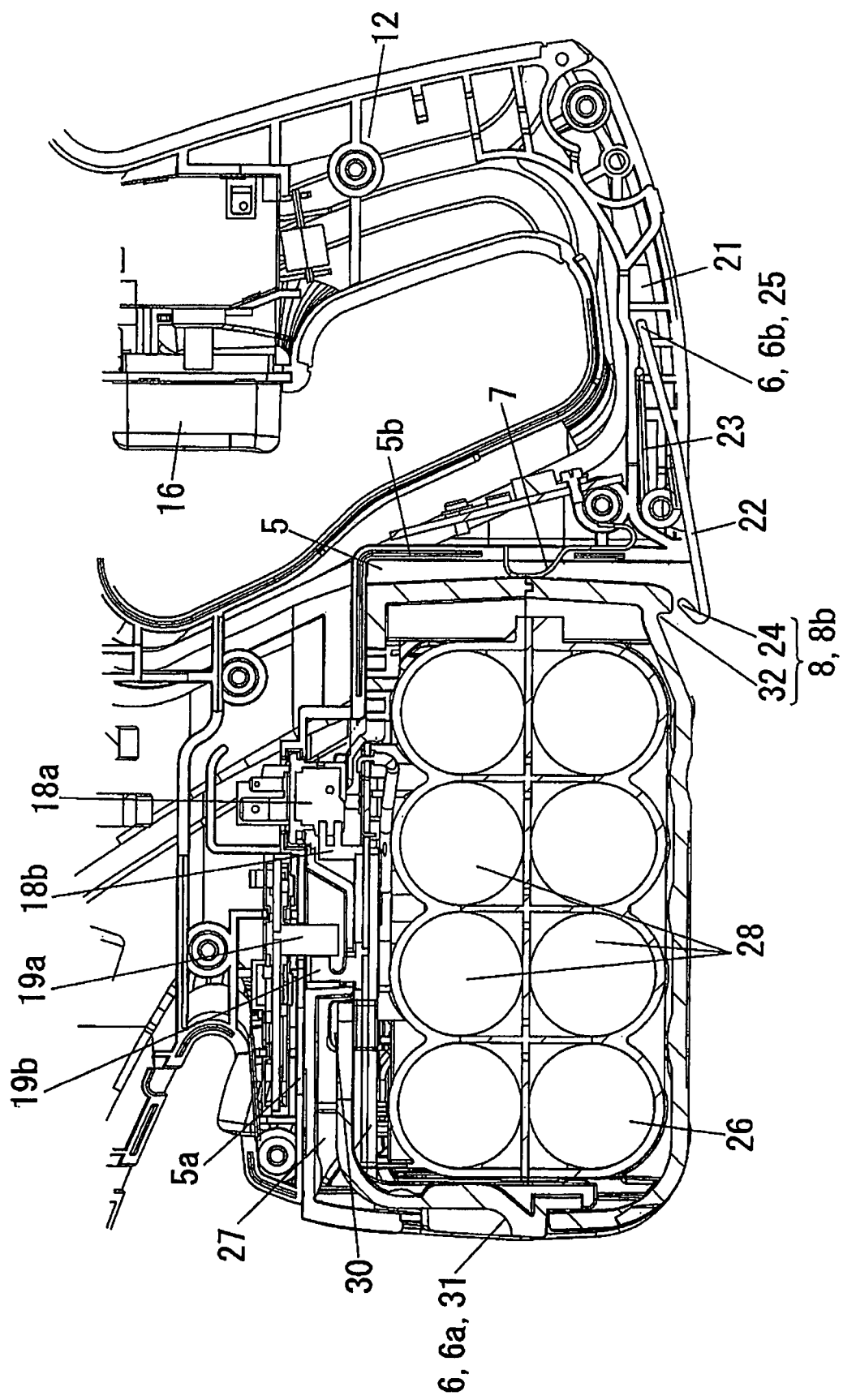
FIG. 9 is a partially enlarged side elevational section view showing the electric power tool in which the battery pack is normally retained in the main body.
Figure 10:
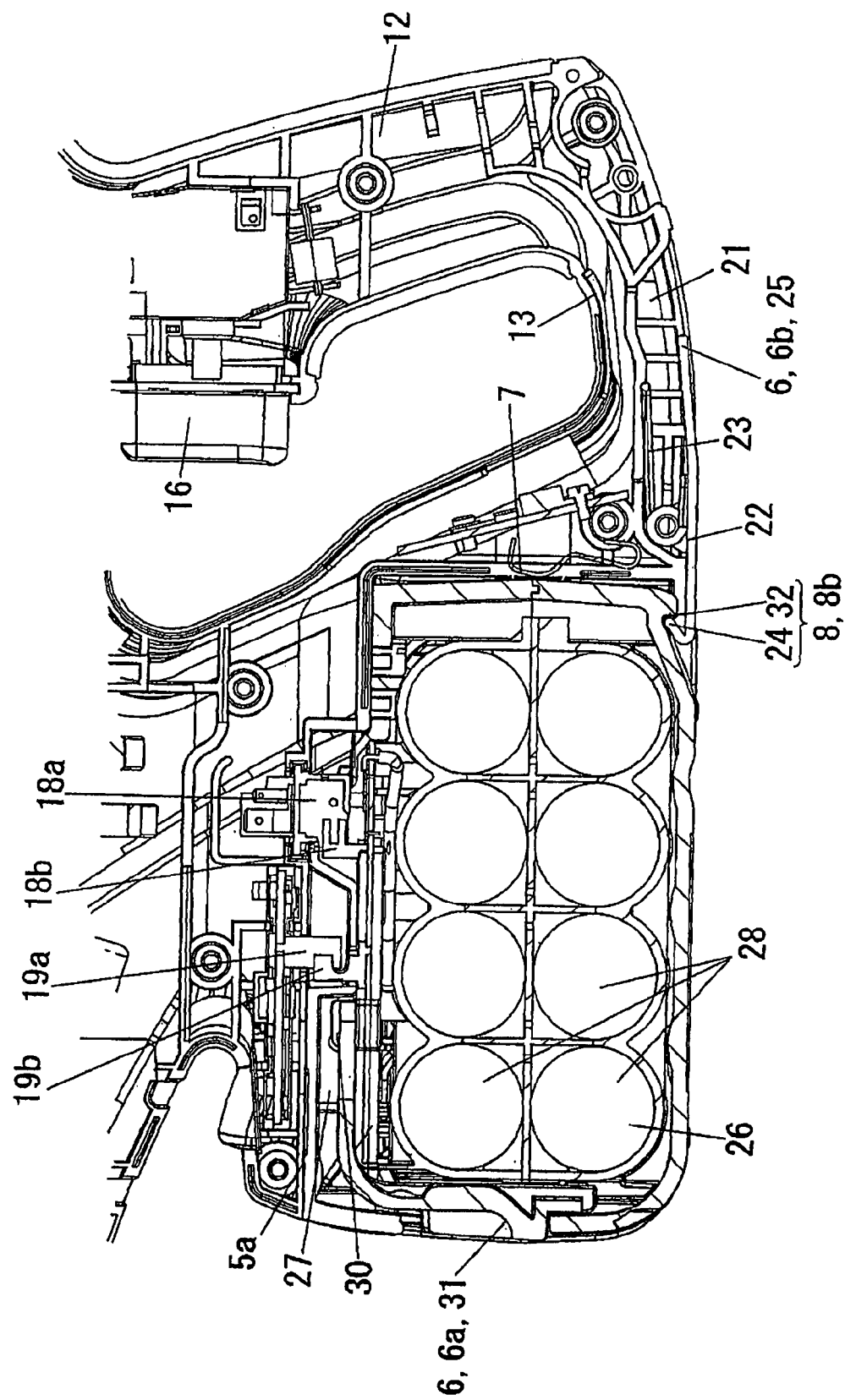
FIG. 10 is a partially enlarged side elevational section view showing the electric power tool in which the battery pack is incompletely retained in the main body.
Figure 11A:
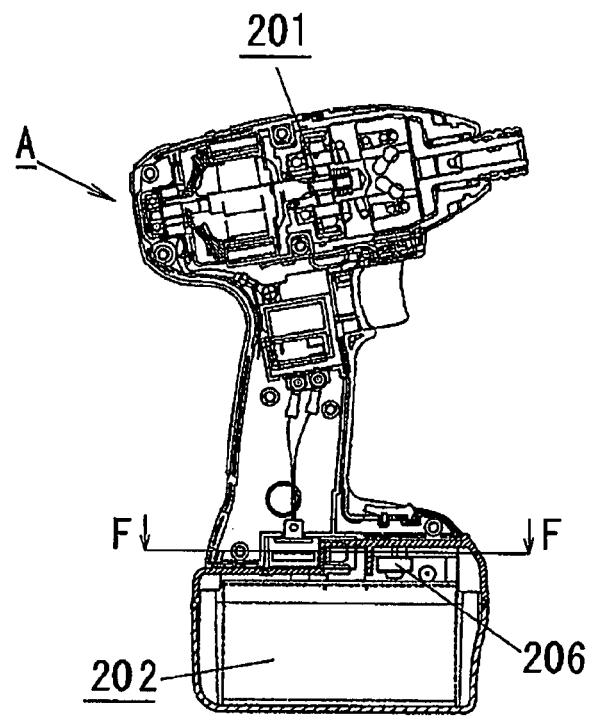
FIG. 11A is an overall side elevational section view showing a conventional electric power tool and FIG. 11B is a section view taken along line F-F in FIG. 11A.
Figure 11B:
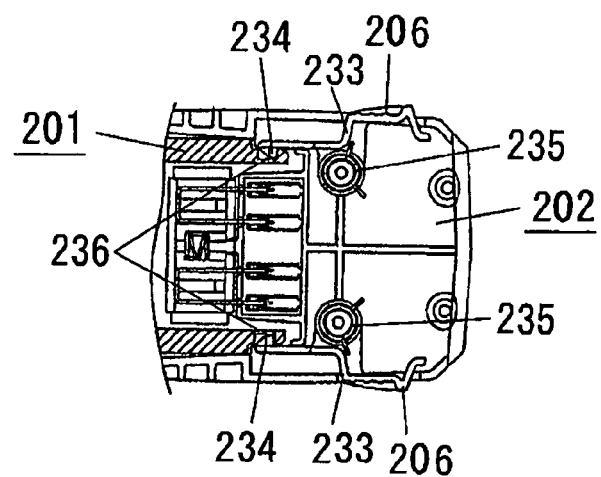

The battery pack 2 is attached to the battery pack attachment portion 5 in the following manner. First, the battery pack 2 is approached toward the battery pack attachment portion 5 and the locking lug portions 20 are inserted into the vertical groove sections 29b of the locking groove portions 29 so that the engaging protrusion 30 can be pushed into the battery pack 2 (the battery receiving portion 26) by one of the locking lug portions 20. Then, the battery pack 2 is slid backwards so that the locking lug portions 20 can be moved inwardly of the horizontal groove sections 29a of the locking groove portions 29 (in the front direction). When moved into the horizontal groove sections 29a, one of the locking lug portions 20 releases the engaging protrusion 30 from the pushed state. Thus the engaging protrusion 30 is returned to the protruding state by the biasing force of the spring to close up the corresponding locking groove portion 29, whereby the locking lug portion 20 received in the horizontal groove section 29a of the corresponding locking groove portion 29 comes into a locked state in which the locking lug portion 20 is prevented from removal by means of the engaging protrusion 30 (see FIG. 2). In other words, as the locking lug portion 20 is kept engaged with the locking groove portions 29 by means of the engaging protrusion 30, the battery pack 2 remains attached to the battery pack attachment portion 5 in a state that it is suspended from the main body 1. At this time, the body-side power supply terminal 18a formed of plug blades is inserted into and connected to the battery-side power supply terminal 18b formed of blade receiving slots, as shown in FIG. 10. More specifically, the engagement of the locking lug portions 20 with the locking groove portions 29 and the connection between the body-side power supply terminal 18a and battery-side power supply terminal 18b are made with a small movement space left therebetween in the front-rear direction. As shown in FIGS. 7A to 7C, if the battery pack 2 is slid in the rear direction in such a manner that the rear surface of the battery pack 2 pushes the elastic body 7 in the rear direction (in the direction indicated by an arrow A), the rear bottom portion of the battery pack 2 rotates the hook portion 24 of the locking piece 22 in the downward direction (in the direction indicated by an arrow B) against the biasing force of the spring 23. Then, the locking piece 22 is rotated upwardly by the resilient restoring force of the spring 23 so the hook portion 24 of the locking piece 22 can be engaged with the locking recess portion 32 (as indicated by an arrow C). In other words, the battery pack 2 is attached to the main body 1 in a state that it suspended from the main body 1 by the engagement of the hook portion 24 of the upwardly biased locking piece 22 with the locking recess portion 32. At this time, as shown in FIG. 9, the body-side control terminal 19a formed of plug blades is inserted into and connected to the battery-side control terminal 19b formed of blade receiving slots. As a consequence, the battery pack 2 is normally retained in the main body 1 (normal retaining state) (see FIG. 1).

The battery pack 2 is detached from the battery pack attachment portion 5 in the following manner. Referring to FIGS. 8A to 8C, the user presses the operation button 25 of the locking piece 22 in the upward direction (as indicated by an arrow D) against the biasing force of the spring 23, thereby releasing the hook portion 24 of the locking piece 22 from engagement with the locking recess portion 32. At this time, the battery pack 2 is slid in the forward direction (as indicated by an arrow E) by the resiliently restoring elastic body 7 and, as shown in FIG. 10, the body-side control terminal 19a is separated from the battery-side control terminal 19b into a non-contact state. The control unit 9 includes therein a detection part 10 that can detect interruption of a control signal from the battery pack 2 caused by separation of the body-side control terminal 19a from the battery-side control terminal 19b. When the detection part 10 detects interruption of the control signal from the battery pack 2, the control unit 9 controls the drive portion 3 in such a manner as to forcibly stop the motor 14 or to extremely reduce the drive output power thereof. The user is notified by the change in the output power of the output portion 4 that the battery pack 2 is not normally attached to the main body 1. At this time, the locking lug portions 20 are kept engaged with the locking groove portion 29 by means of the engaging protrusion 30 (see FIG. 2). Then, the operation button 31 arranged on the front surface of the battery pack 2 is downwardly pressed against the biasing force of the spring so that the engaging protrusion 30 is retracted into the battery pack 2 to bring the locking groove portion 29 into an opened state. In this state, the battery pack 2 is slid in the front direction in a state that By doing so, the locking lug portion 20 is moved out of the horizontal groove section 29a through the vertical groove section 29b and thus separated from the locking groove portion 29, whereby the locking lug portion 20 is released from engagement with the locking groove portion 29. At this time, the body-side power supply terminal 18a is separated from the battery-side power supply terminal 18b into a non-contact state. Consequently, the battery pack 2 is completely detached from the main body 1.

As described above, the battery pack 2 is detachably attached to the main body 1 through the attaching and detaching mechanism. In other words, the attaching and detaching mechanism of the present embodiment includes a first retainer unit 8a for retaining the battery pack 2 in the main body 1 using the engaging structure by which the engaging protrusion 30 keeps the locking lug portion 20 engaged with the locking groove portion 29 and a second retainer unit 8b for retaining the battery pack 2 in the main body 1 using the locking structure by which the hook portion 24 of the locking piece 22 is locked to the locking recess portion 32. In more detail, the first retainer unit 8a arranged at the upper section of the battery pack attachment portion 5 is designed to retain the battery pack 2 in the main body 1 in a state that the battery pack 2 is suspendedly held by the ceiling attachment section 5a, while the second retainer unit 8b arranged at the lower section of the battery pack attachment portion 5 is designed to retain the battery pack 2 in the main body 1 by supporting the battery pack 2 by the rear attachment section 5b thereof. Despite the fact that the battery pack attachment portion 5 has the void space opened downwardly, it is possible to reliably prevent the battery pack 2 from falling down from the main body 1, because the battery pack 2 is retained in the main body 1 through the suspension support offered by the first retainer unit 8a and the bottom support provided by the second retainer unit 8b. In the present embodiment, the top surface of the mounting base portion 27 of the battery pack 2 whose bottom is supported by the second retainer unit 8b is adapted to make contact with the ceiling attachment section 5a. In other words, the battery pack 2 is interposed between the locking piece 22 of the second retainer unit 8b and the ceiling attachment section 5a of the battery pack attachment portion 5. Thus the battery pack 2 is prevented from shaking in the vertical direction.

During the process of attaching the battery pack 2 to the main body 1, the tasks of retaining the battery pack 2 in the main body 1 by use of the first retainer unit 8a and the second retainer unit 8b are sequentially performed by the approaching operation of the battery pack 2 toward the battery pack attachment portion 5 (the sliding operation of the battery pack 2 in the rear direction) in which time the locking lug portions 20 are slidingly guided by the horizontal groove sections 29a of the locking groove portions 29. In other words, the attaching and detaching mechanism includes a retaining guide means by which the sliding movement of the locking lug portions 20 is restrained by the horizontal groove sections 29a of the locking groove portions 29. Therefore, the task of retaining the battery pack 2 in the main body 1 is finalized by the approaching operation of the battery pack 2 toward the battery pack attachment portion 5. This helps improve the ease with which the battery pack 2 is attached to the battery pack attachment portion 5.

The attaching and detaching mechanism of the present embodiment employs a releasing means. With this releasing means, the first retainer unit 8a is released from the retaining state by operating a first release operation portion 6a having the operation button 31 arranged on the front surface of the battery pack 2 and the second retainer unit 8b is released from the retaining state by operating a second release operation portion 6b having the operation button 25 of the locking piece 22 arranged on the bottom surface of the main body 1. Only when all the release operation portions (the first release operation portion 6a and the second release operation portion 6b) are operated by the user, the battery pack 2 can be released from retainment in the main body 1. In this regard, the first release operation portion 6a is arranged on the front surface of the battery pack 2 and is adapted to perform a release operation when it is pressed downwardly. The second release operation portion 6b is arranged on the bottom surface of main body 1 and is adapted to perform a release operation when it is pressed upwardly. This means that, unlike the conventional release operation portions operated by merely grasping the same, the release operation portions 6 of the present embodiment make no pair with each other in position and operational direction and have no geometrical regularity (symmetrical or facing relationship) in position and operational direction. That is to say, the release operation portions 6 are of the different types. As described above, the attaching and detaching mechanism is provided with the releasing means that includes plural types of the release operation portions 6 (two types in the present embodiment, including the first release operation portion 6a and the second release operation portion 6b) and allows the battery pack 2 to be released from the main body 1 only when the plural types of the release operation portions 6 are all operated. This helps prevent any separation of the battery pack 2 from the main body 1 when one of the release operation portions 6 is erroneously operated by, e.g., striking the electric power tool A against an object, or when one of the release operation portions 6 is erroneously operated by hastily grasping the electric power tool A. Thus, it is possible to reliably prevent the battery pack 2 from being inadvertently detached from the main body 1. The reason for separately arranging the release operation portions 6 in the battery pack 2 and the main body 1 is to dispose the release operation portions 6 in relatively distant positions, thereby making it difficult to simultaneously operate the release operation portions 6 with one hand. This reduces the possibility that the releasing means is erroneously operated by the erroneous operation of all of the release operation portions 6 and helps improve the effect of preventing any inadvertent separation of the battery pack 2 from the main body 1.

In a state that the battery pack 2 is attached to the battery pack attachment portion 5, the outer surfaces of the battery pack 2 extend substantially continuously from the outer surfaces of the main body 1. In other words, the bottom surface of the battery pack 2 extends in a generally flush relationship with the bottom surface of the main body 1 (the bottom surface of the connection portion 13) and thus forms the bottom surface of the electric power tool A. Furthermore, the side surfaces of the battery pack 2 extend in a generally flush relationship with the side surfaces of the main body 1 and thus form the side surfaces of the electric power tool A. Moreover, the front surface of the battery pack 2 faces frontward and forms the front surface of the electric power tool A. In this connection, the release operation portions 6 are positioned a little inwardly of the outer surfaces of the battery pack 2 (in such a state as not to protrude outwardly). This helps to prevent the release operation portions 6 from being erroneously pressed even when the electric power tool A is collided with an object or inadvertently dropped. In particular, although the second release operation portion 6b is arranged on the bottom surface of the main body 1, it is possible to avoid any erroneous operation of the second release operation portion 6b even when the bottom surface of the main body 1 is laid on the rest surface or the like. This is because the second release operation portion 6b corresponding to the second retainer unit 8b is arranged inwardly of the outer surface of the main body 1 as set forth above (see FIGS. 7C and 8A).

Although the attaching and detaching mechanism is provided with the releasing means to ensure that the battery pack 2 cannot be separated from the main body 1 without operating the release operation portions 6 in their entirety, it is possible to operate the release operation portions 6 not simultaneously but one after another, thereby facilitating the task of detaching the battery pack 2 from the main body 1. In the retainer unit (the second retainer unit 8b in the present embodiment) corresponding to the release operation portion 6 (the second release operation portions 6b in the present embodiment) other than the release operation portion 6 operated latest during the detaching task, there is provided a release state keeping means by which the battery pack 2 is kept released once it is released from the main body 1 by the operation of the corresponding release operation portion 6 (see FIG. 8C). The release state keeping means of the present embodiment includes the elastic body 7 that functions to displace the battery pack 2 and bring the locking recess portion 32 into a position deviated from the hook portion locking position, when the hook portion 24 of the locking piece 22 is released from the locking recess portion 32. Thus, the battery pack 2 can be detached from the battery pack attachment portion 5 by operating the plural types of the release operation portions 6 one after another. This makes it possible to easily perform the task of detaching the battery pack 2 from the battery pack attachment portion 5. The elastic body 7 of the present embodiment is adapted to bias the battery pack 2 in the separating direction in which the battery pack 2 is detached from the battery pack attachment portion 5, i.e., in the direction (front direction) in which the battery pack 2 is drawn from the battery pack attachment portion 5. Therefore, the elastic body 7 assists in sliding the battery pack 2 in the front direction and detaching the same from the battery pack attachment portion 5. This also helps improve the ease with which the battery pack 2 is detached from the battery pack attachment portion 5. The elastic body 7 may be designed to continuously bias the battery pack 2 during the course of detaching the battery pack 2 from the battery pack attachment portion 5. This is desirable because the biasing force of the elastic body 7 provides more assistance in detaching the battery pack 2. Furthermore, the elastic body 7 keeps biasing the battery pack 2 while the latter is attached to the battery pack attachment portion 5. Therefore, the elastic body 7 functions to prevent the battery pack 2 attached to the battery pack attachment portion 5 from being shaken in the front-rear direction.

Figure 2:
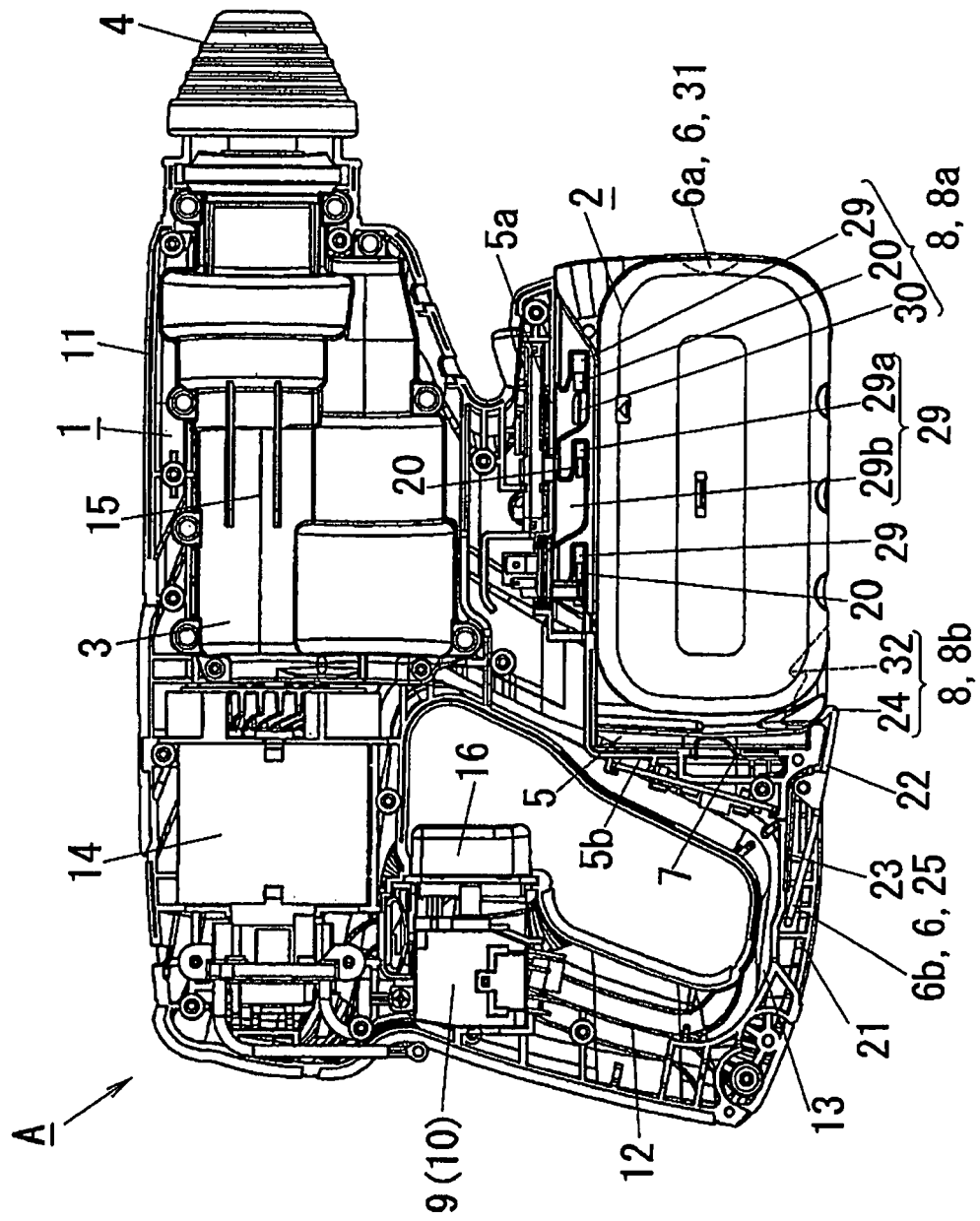
FIG. 2 is a side elevational section view showing the electric power tool in which the battery pack is incompletely retained in the main body.
Figure 3:
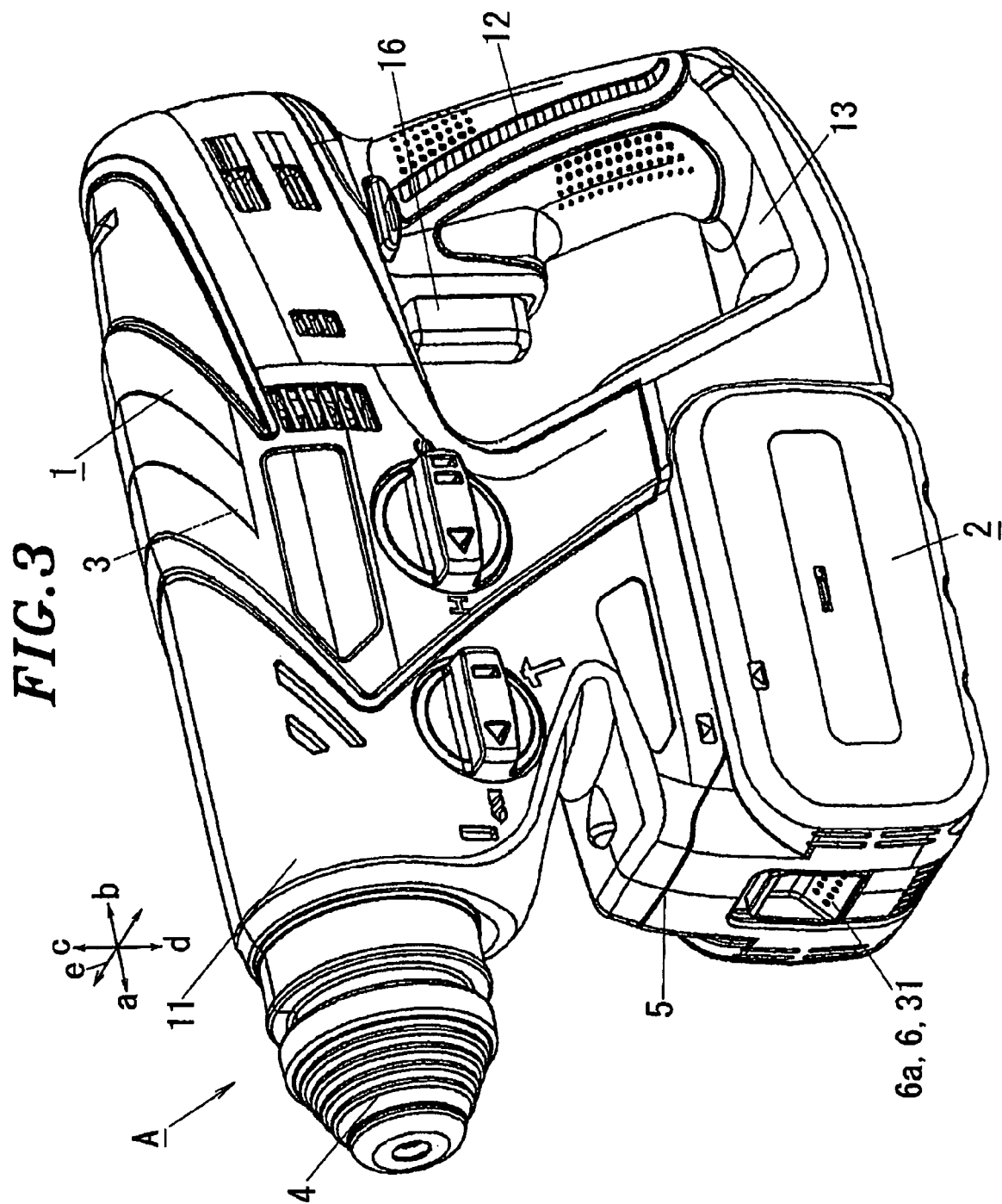
FIG. 3 is a perspective view of the electric power tool.
Figure 4:
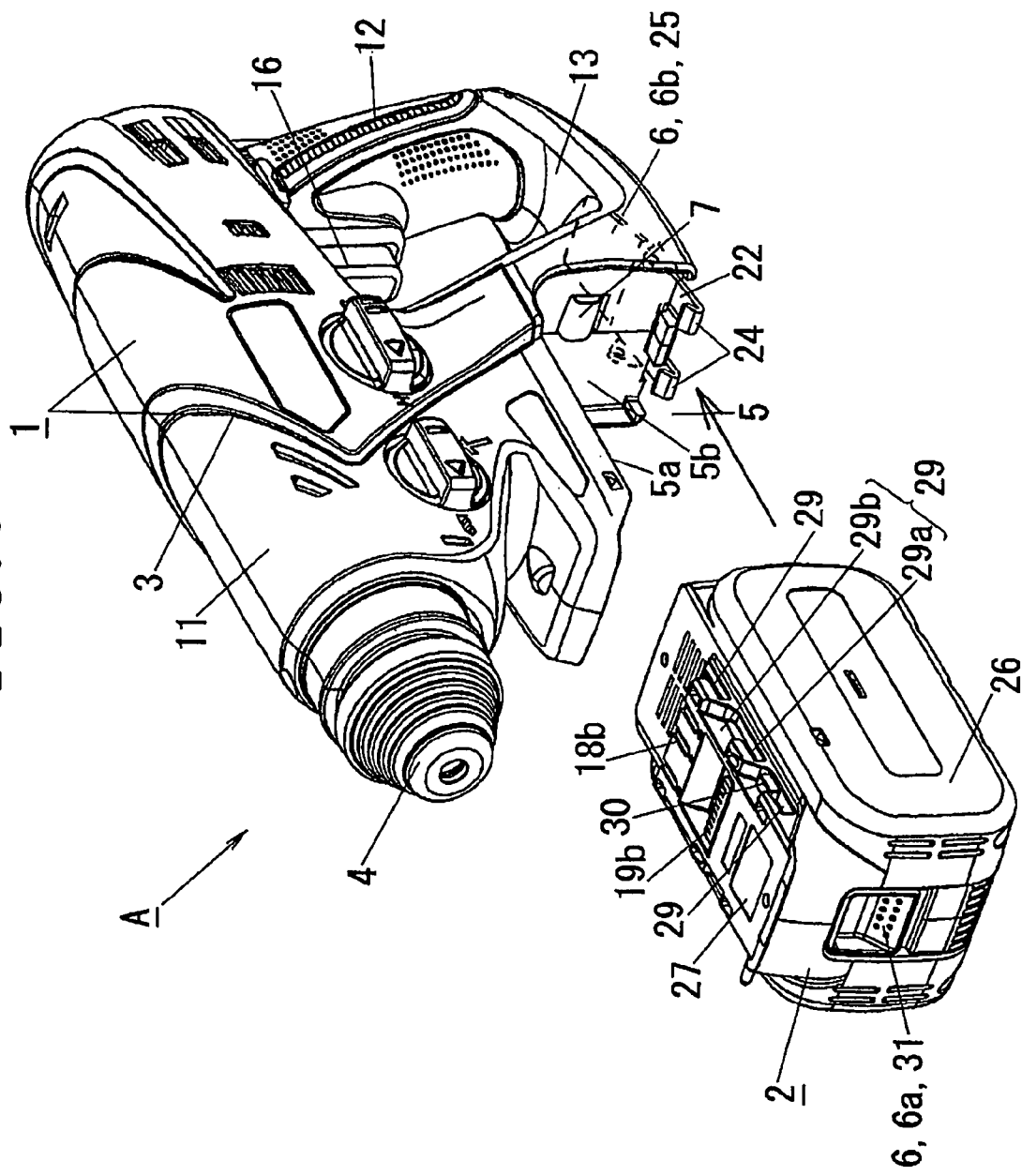
FIG. 4 is an exploded perspective view of the electric power tool.
Figure 5:
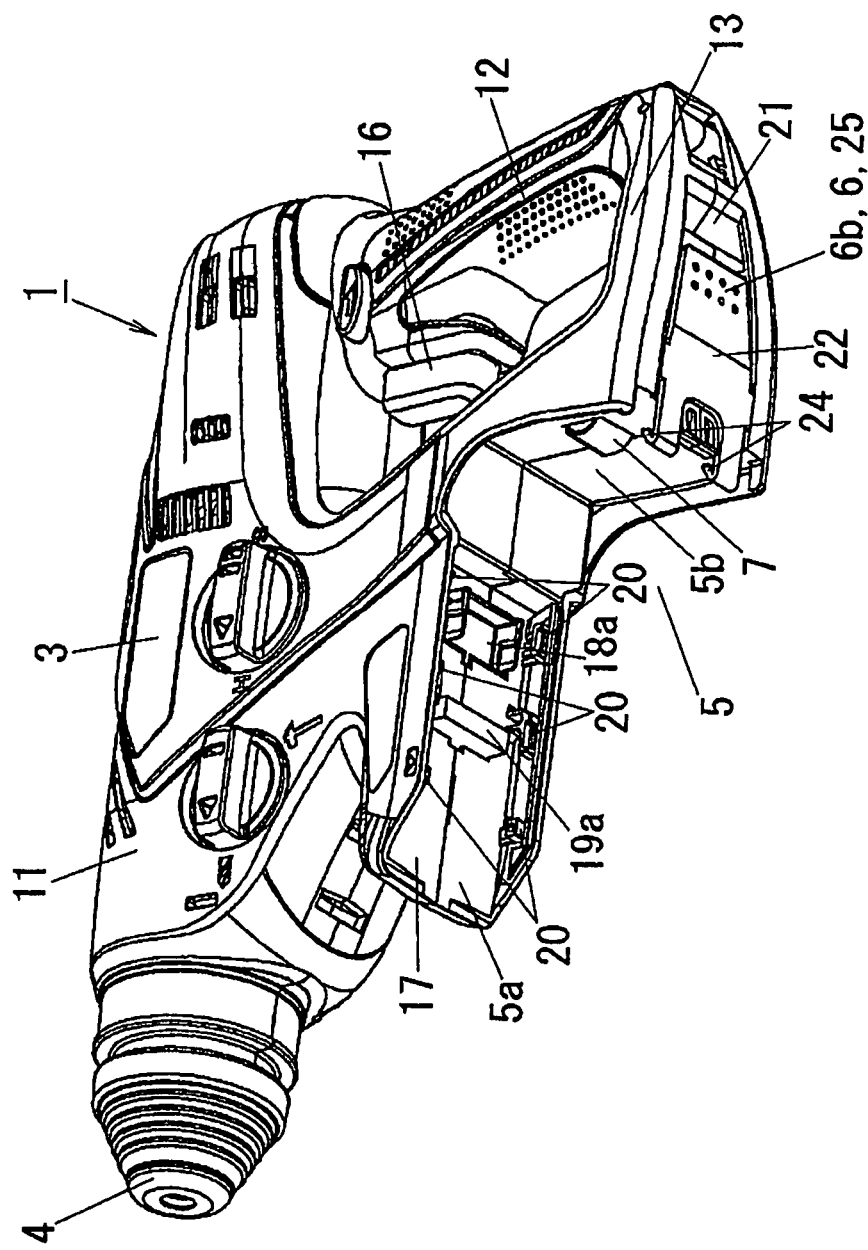
FIG. 5 is a bottom perspective view of the electric power tool.
Figure 6:
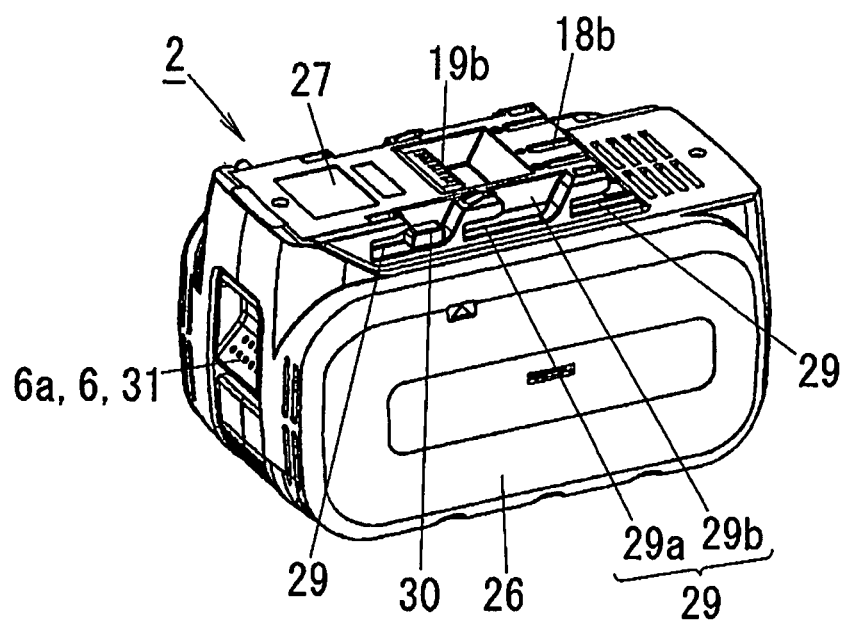
FIG. 6 is a perspective view of the battery pack of the electric power tool.
Figure 7:
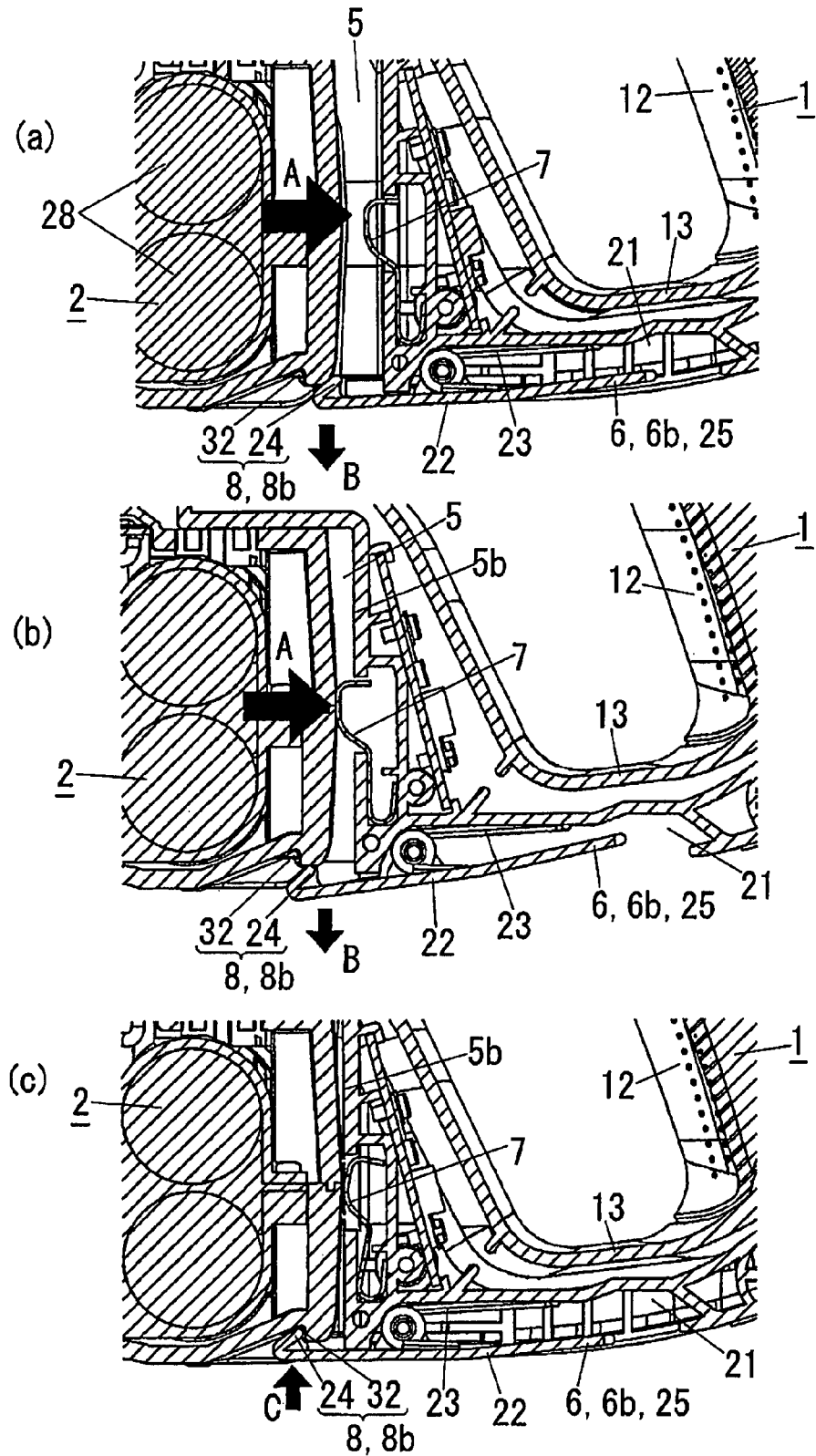
FIGS. 7A, 7B and 7C are partially enlarged section views showing, in seriatim, the tasks of attaching the battery pack of the electric power tool to the main body.
Figure 8:
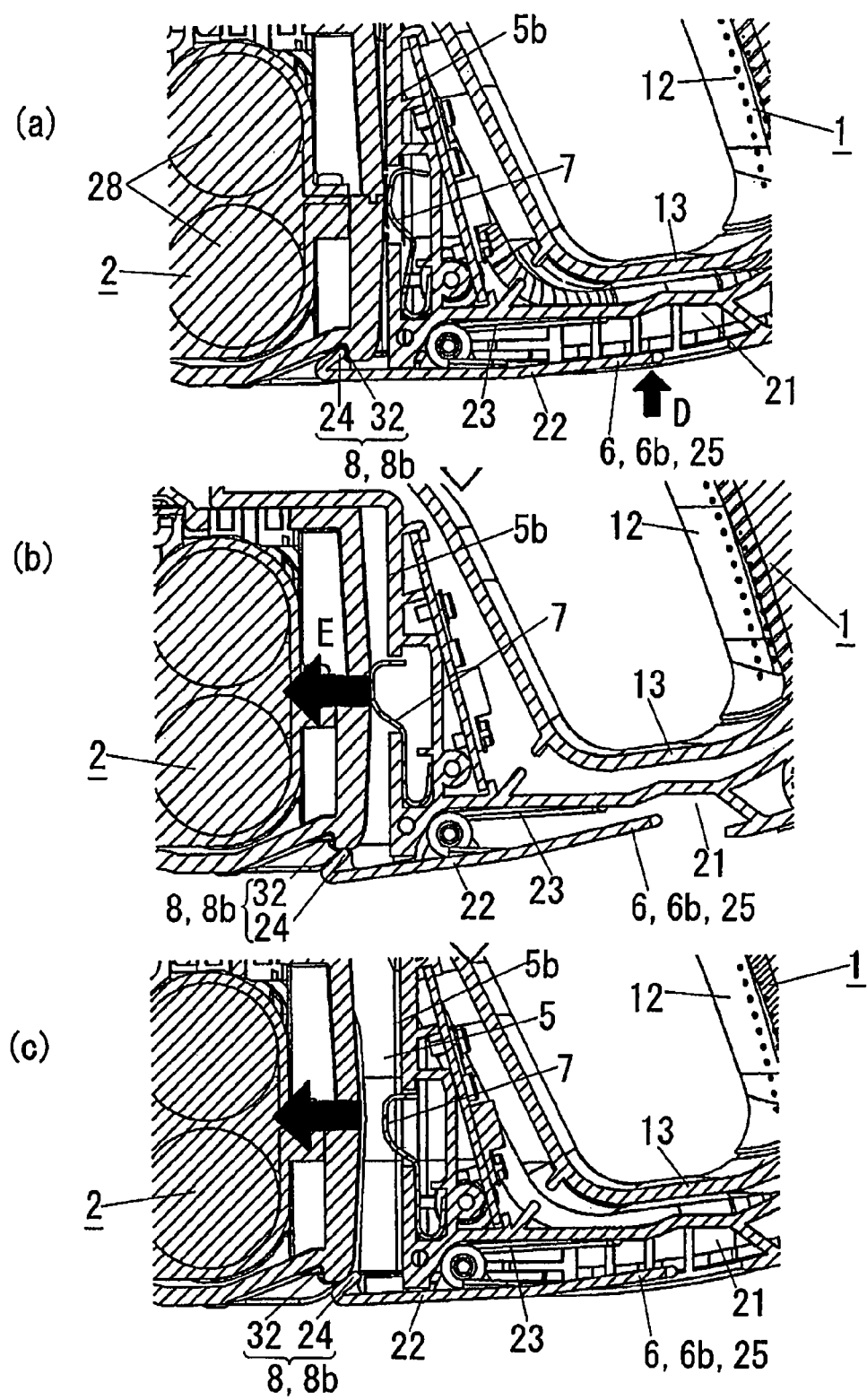
FIGS. 8A, 8B and 8C are partially enlarged section views showing, in seriatim, the tasks of detaching the battery pack of the electric power tool from the main body.

As described above, in the electric power tool A of the present embodiment, when the body-side control terminal 19a is separated from the battery-side control terminal 19b as shown and when the detection part 10 included in the control unit 9 has detected interruption of the control signal supplied from the battery pack 2, the control unit 9 forcibly stops the motor 14 or extremely reduces the drive output power, thereby changing the output power of the output portion 4 and notifying the user that the battery pack 2 is not normally attached to the main body 1. In other words, if, while the first retainer unit 8a maintains a retaining state, the second retainer unit 8b is released to thereby leave the battery pack 2 in an incompletely attached state (in a provisional retaining state as shown in FIG. 2), the detection part 10 and the control unit 9 cooperate with each other to reduce the output power of the output portion 4 in a manner readily understandable by the user of the electric power tool A, thereby allowing the user to perceive that the battery pack 2 is not normally retained in the main body 1 and urging the user to take a measure for normally retaining the battery pack 2 in the main body 1. Thus, the battery pack 2 can be firmly attached to and retained in the main body 1.

Although the attaching and detaching mechanism illustrated in the foregoing embodiment has two retainer units 8 and two release operation portions 6, the number of the retainer units 8 is not limited thereto but may be arbitrarily selected and, likewise, the number of the release operation portions 6 is not limited thereto but may be greater than two. If the attaching and detaching mechanism is provided with a releasing means for releasing the battery pack 2 from the main body 1 by operating plural types of release operation portions 6 in their entirety, the battery pack 2 is locked to the main body 1 in an increased number of positions as the number of the release operation portions 6 becomes greater. Needless to say, this helps improve the effect of preventing any inadvertent separation of the battery pack 2 from the main body 1.

While the invention has been shown and described with respect to the embodiments, it will be understood by those skilled in the art that various changes and modifications may be made without departing from the scope of the invention as defined in the following claims.

What is claimed is:

1. An electric power tool comprising:
   a main body including a drive portion with a motor, an output portion for holding a tool, and a battery pack attachment portion; and
   a battery pack attached to the battery pack attachment portion by means of an attaching and detaching mechanism, the battery pack supplying electric power to the drive portion to operate the output portion,
   wherein the attaching and detaching mechanism includes a first release operation portion and a second release operation portion, and the battery pack is released from the main body by independently actuating the first and the second release operation portions,
   wherein the first release operation portion is arranged in the battery pack and includes an externally exposed user-operable button, and the second release operation portion is arranged in the main body and includes an externally exposed user-operable button, and
   wherein the battery pack attachment portion is downwardly opened and wherein the attaching and detaching mechanism includes a first retainer unit for retaining a top portion of the battery pack in the main body in a suspended state and a second retainer unit for retaining a bottom portion of the battery pack in the main body by supporting the bottom portion of the battery pack.

2. The electric power tool of claim 1, wherein the attaching and detaching mechanism includes a plurality of retainer units for retaining the battery pack in the main body, the retainer units adapted to be released in response to the operation of the release operation portions, and wherein the retainer units include a release state keeping unit for keeping the battery pack released from the battery pack attachment portion when the battery pack is released by operating the release operation portions.

3. The electric power tool of claim 1, wherein the attaching and detaching mechanism includes a retaining guide unit for normally retaining the battery pack in the main body through an approaching operation of the battery pack toward the battery pack attachment portion.

4. The electric power tool of claim 1, further comprising an elastic body for biasing the battery pack attached to the battery pack attachment portion in a direction of separating the battery pack from the battery pack attachment portion.

5. The electric power tool of claim 1, wherein the second release operation portion is configured to release the second retainer unit, the second release operation portion being arranged inwardly of an outer surface of the main body.

6. The electric power tool of claim 1, further comprising a detection part for detecting failure to normally retain the battery pack in the main body and a control unit for controlling output power of the output portion in response to the detection of the detection part.

7. The electric power tool of claim 1, wherein the first release operation portion is adapted to perform a first release operation when it is pressed downwardly while the second release operation portion is adapted to perform a second release operation when it is pressed upwardly.

8. The electric power tool of claim 1, wherein the first release operation portion is adapted to perform a first release operation when it is pressed downwardly and the second release operation portion is adapted to perform a second release operation when it is pressed upwardly, the first release operation releasing the top portion of the battery pack retained in the main body by the first retainer unit and the second release operation unit releasing the bottom portion of the battery pack retained in the main body by the second retainer unit.

9. The electric power tool of claim 1, wherein the battery pack includes a mounting base portion protruding from a top surface of the battery pack and the battery pack attachment portion includes an attachment groove for receiving the mounting base portion, wherein the first retainer unit includes locking lug portions protruding from inner side surfaces of the attachment groove, locking groove portions provided on the mounting base portion, and at least one engaging protrusion retractably arranged in a bottom portion of at least one of the locking groove portions to open and close said at least one of the locking groove portions, and wherein the first retainer unit retains the top portion of the battery pack in the main body by keeping the locking lug portions engaged with the locking groove portions by means of the engaging protrusion.

10. The electric power tool of claim 1, wherein the second retainer unit includes a locking piece pivotally attached to the main body and having an upwardly extending hook portion, and a locking recess portion formed at a bottom surface of the battery pack, and wherein the second retainer unit retains the bottom portion of the battery pack in the main body by locking the hook portion to the locking recess.

11. The electric power tool of claim 9, wherein the second retainer unit includes a locking piece pivotally attached to the main body and having an upwardly extending hook portion, and a locking recess portion formed at a bottom surface of the battery pack, and wherein the second retainer unit retains the bottom portion of the battery pack in the main body by locking the hook portion to the locking recess.

12. The electric power tool of claim 9, wherein the first release operation portion is configured to retract the engaging protrusion into the battery pack to bring the locking groove portion into an opened state when the first release operation portion is downwardly pressed.

13. The electric power tool of claim 10, wherein the second release operation portion is configured to release the hook portion from the locking recess portion when the second release operation portion is upwardly pressed.

14. The electric power tool of claim 11, wherein the first release operation portion is configured to retract the engaging protrusion into the battery pack to bring the locking groove portion into an opened state when the first release operation portion is downwardly pressed, and wherein the second release operation portion is configured to release the hook portion from the locking recess portion when the second release operation portion is upwardly pressed.

* * * * *